(12) United States Patent
Boe et al.

(10) Patent No.: US 10,094,914 B2
(45) Date of Patent: *Oct. 9, 2018

(54) METHOD AND SYSTEM FOR PROPAGATION TIME MEASUREMENT AND CALIBRATION USING MUTUAL COUPLING IN A RADIO FREQUENCY TRANSMIT/RECEIVE SYSTEM

(71) Applicant: RAYTHEON COMPANY, Waltham, MA (US)

(72) Inventors: Eric N. Boe, Long Beach, CA (US); William L. Lewis, Redondo Beach, CA (US); John Fraschilla, Marina del Rey, CA (US)

(73) Assignee: RAYTHEON COMPANY, Waltham, MA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/266,888

(22) Filed: Sep. 15, 2016

(65) Prior Publication Data
US 2017/0139037 A1    May 18, 2017

Related U.S. Application Data

(62) Division of application No. 12/825,193, filed on Jun. 28, 2010, now abandoned.

(51) Int. Cl.
*H04B 17/00* (2015.01)
*G01S 7/40* (2006.01)

(52) U.S. Cl.
CPC .................. *G01S 7/4017* (2013.01)

(58) Field of Classification Search
CPC ........ H01Q 3/267; H01Q 3/26; H01Q 1/2266; H01Q 1/241; H01Q 1/38; H01Q 21/08;
(Continued)

(56) References Cited

U.S. PATENT DOCUMENTS 3,882,393 A * 5/1975 Epstein ............... H04B 14/008
342/361
4,150,375 A    4/1979 Ross et al.
(Continued)

FOREIGN PATENT DOCUMENTS

EP       1 670 095 A1    6/2006
WO    WO 2009/019526 A1    2/2009

OTHER PUBLICATIONS

Extended European Search Report for European Application No. 11169999.7, Filed Jun. 15, 2011, Extended European Search Report dated Sep. 17, 2012 and dated Sep. 25, 2012 (8 pgs).

*Primary Examiner* — Golam Sorowar
(74) *Attorney, Agent, or Firm* — Lewis Roca Rothgerber Christie LLP

(57) ABSTRACT

A method and system use the mutual coupling property of multiple antenna elements for measuring differences in propagation time among various signal paths involving antenna elements in a radio frequency transmit/receive system. The method and system alleviate the need for external test equipment by using the same hardware used in standard operation of the transmit/receive system for performing propagation time measurement through the generation, mutual coupling, and acquisition of a specially selected reference signal. In an embodiment involving calibration of various signal paths to realize matched propagation times, the signal energy returned through these various paths during standard system operation arrives for acquisition more closely coincident in time, increasing the instantaneous bandwidth of the system.

13 Claims, 10 Drawing Sheets

(58) Field of Classification Search
CPC .......... H01Q 21/28; H01Q 25/02; H01Q 3/24; H01Q 9/40; H04B 17/21; H04B 17/10; H04B 17/20; H04B 17/309; H04B 1/7107; H04B 7/022; H04B 7/04; H04B 7/0606; H04B 7/0608; H04B 7/0615; H04B 7/0634; H04B 7/0639; H04B 7/0641; H04B 7/0665; H04B 7/0671; H04B 7/0689; H04B 7/08

See application file for complete search history.

(56) References Cited

U.S. PATENT DOCUMENTS

| | | | |
|---|---|---|---|
| 4,968,968 A | 11/1990 | Taylor | |
| 5,493,304 A | 2/1996 | Lee et al. | |
| 5,657,023 A | 8/1997 | Lewis et al. | |
| 5,682,165 A | 10/1997 | Lewis et al. | |
| 5,809,087 A * | 9/1998 | Ashe | H01Q 3/267 342/165 |
| 5,864,317 A | 1/1999 | Boe et al. | |
| 5,952,955 A | 9/1999 | Kennedy et al. | |
| 6,118,811 A | 9/2000 | Narumi et al. | |
| 6,308,085 B1 | 10/2001 | Shoki | |
| 6,509,883 B1 | 1/2003 | Foti et al. | |
| 6,597,730 B1 * | 7/2003 | Bader | H01Q 1/241 375/141 |
| 6,693,588 B1 * | 2/2004 | Schlee | H01Q 3/267 342/165 |
| 6,751,447 B1 | 6/2004 | Jin et al. | |
| 7,212,791 B2 | 5/2007 | Arayashiki | |
| 7,817,641 B1 | 10/2010 | Khandani | |
| 7,826,808 B2 | 11/2010 | Faulkner | |
| 2001/0055280 A1 | 12/2001 | Honda et al. | |
| 2002/0128007 A1 * | 9/2002 | Miyatani | H01Q 3/267 455/423 |
| 2005/0190100 A1 * | 9/2005 | Hester | G01S 7/4004 342/174 |
| 2005/0280572 A1 * | 12/2005 | Shima | G01S 7/034 342/70 |
| 2007/0069945 A1 * | 3/2007 | Weese | H01Q 3/267 342/174 |
| 2007/0135057 A1 | 6/2007 | Nallapureddy et al. | |
| 2007/0182619 A1 * | 8/2007 | Honda | H01Q 25/02 342/80 |
| 2008/0012748 A1 | 1/2008 | Ahn | |
| 2008/0095286 A1 * | 4/2008 | Lieuwen | H04N 5/04 375/354 |
| 2008/0248765 A1 | 10/2008 | Gater | |
| 2008/0300003 A1 | 12/2008 | Jeck et al. | |
| 2009/0153394 A1 | 6/2009 | Navarro et al. | |
| 2009/0186590 A1 * | 7/2009 | Gale | H04B 17/21 455/272 |
| 2009/0267824 A1 * | 10/2009 | Cooper | H01Q 3/267 342/174 |
| 2010/0067588 A1 * | 3/2010 | Takano | H04B 7/0689 375/260 |

\* cited by examiner

METHOD AND SYSTEM FOR PROPAGATION TIME MEASUREMENT AND CALIBRATION USING MUTUAL COUPLING IN A RADIO FREQUENCY TRANSMIT/RECEIVE SYSTEM

CROSS-REFERENCE TO RELATED APPLICATION(S)

The present application is a divisional of U.S. patent application Ser. No. 13/825,193, filed Jun. 28, 2010, published Dec. 29, 2011 as Publication No. 2011/0319034 A1, and entitled "METHOD AND SYSTEM FOR PROPAGATION TIME MEASUREMENT AND CALIBRATION USING MUTUAL COUPLING IN A RADIO FREQUENCY TRANSMIT/RECEIVE SYSTEM", now abandoned, the entire content of which is incorporated herein by reference.

BACKGROUND OF THE INVENTION

Emerging applications for radio frequency transmit/receive systems are demanding increased instantaneous bandwidth. Such applications include high-data-rate communications, low-probability-of-detection communications, simultaneous occupancy of radio frequency spectrum by multiple users, high-resolution imaging radar, low-probability-of-detection radar, wide-bandwidth electronic signals surveillance, and wide-bandwidth jamming of signals. In all these applications, it is essential for energy from the entire desired spectrum bandwidth to arrive at the receiver. In systems featuring multiple antenna elements associated with multiple signal paths in parallel, maximal energy transfer requires that the signals propagating through these multiple paths arrive at the receiver simultaneously, or as near simultaneously as possible. This does not necessarily occur naturally in a system, because various signal paths associated with various antenna elements may feature different signal propagations times, due to diverse causes such as component manufacturing tolerances and differences in signal path length, leading to offsets in signal energy arrival times.

Prior approaches to the problem of multiple signal paths causing signal returns scattered in time have used combinations of strategies such as matching various hardware units in propagation time during manufacture, selecting for use in a particular system those hardware units that as manufactured happen to feature the most similar propagation times, and propagation time measurement among various signal paths in a particular system using external measuring equipment followed by manual calibration adjustments using propagation time adjustment mechanisms in various of the system's signal paths. Where propagation time matching or calibration is not employed, the system may simply be used with its bandwidth or field of view reduced to the limits permitted by the propagation time mismatches occurring among various uncalibrated signal paths associated with various antenna elements. This last approach is particularly common for systems using the current generation of electronically scanned array or "ESA" antennas, which use phase and amplitude adjustment for beam formation and beam steering.

Prior approaches that involve propagation time measurement and calibration have required dedicated external equipment. Moreover, propagation time measurement and calibration using these approaches have required additional circuitry that bypasses the normal operating signal paths and feeds signals specially between different portions of the system for measurement. Such special bypassing and feeding leads to measurements for only a portion of the system signal paths, rather than for the entire lengths of the relevant operational signal paths, and so may leave unmeasured and uncalibrated those propagation time mismatches arising in other portions of the signal paths.

SUMMARY OF THE INVENTION

A method and system that uses the same hardware and the same signal paths both for regular operation and for propagation time measurement and calibration, and that can measure and calibrate propagation time for the entire lengths of parallel signal paths within a system, would improve on the prior art and would be beneficial. The present invention achieves such goals by leveraging two characteristics often found in systems using ESA antennas, and other systems as well. First, these systems often possess the ability simultaneously to transmit signals from their transmitting side and antenna radiating elements while receiving signals through their antenna receiving elements and receiving side. Second, these systems display the phenomenon known as "mutual coupling" among multiple antenna elements, wherein a portion of the signal being transmitted from a radiating element is coupled directly back into a receiving element. This phenomenon has often been considered a nuisance, but the present invention turns the mutual coupling phenomenon to its advantage for determining and calibrating propagation time among parallel signal paths and so achieving improved instantaneous bandwidth performance, without the need for dedicated external measurement equipment.

The present invention is directed to a method and system for a radio frequency transmit system that uses a specially selected reference signal and takes advantage of the mutual coupling property of multiple antenna elements to determine, without the need for dedicated external test equipment, the difference in signal propagation times through various parallel signal paths under test, here called "subject signal paths." It does so using mutual coupling either between a common antenna radiating element transmitting to multiple antenna receiving elements or between multiple antenna radiating elements transmitting to a common antenna receiving element. Certain embodiments of the invention include calibration of the system by adjusting the propagation time through one or more of the subject signal paths to match the propagation time through other of the subject signal paths, thus allowing signals passing through the various parallel subject signal paths to arrive for acquisition at the signal receiver more closely coincident in time, for maximum bandwidth energy transfer and increased instantaneous bandwidth.

According to one embodiment, the present invention is directed to a method for measuring propagation times among various receiving signal paths in a radio frequency transmit/receive system. In this method, a radio frequency reference signal is generated, that signal is transmitted through a transmit side comprising a transmitting signal path comprising an antenna radiating element, and that transmitting signal path and antenna radiating element are also usable for transmitting an operational signal. That signal is also received through a receive side comprising a receiving signal path comprising an antenna receiving element, and that receiving signal path and antenna receiving element are also usable for receiving an operational signal. That signal is also propagated through a mutual coupling field from at least one antenna radiating element to at least one antenna receiving element. At least one of the transmit side or the receive side comprises a plurality of transmitting signal paths or receiving signal paths, respectively, and these signal paths are the subject signal paths under analysis. Also in this method, the received reference signal is processed to determine at least one characteristic of signal propagation time for at least one of the subject signal paths.

According to one embodiment where the plurality of subject signal paths is on the receive side, the reference signal is propagated from at least one antenna radiating element to at least two antenna receiving elements each disposed substantially along an equipotential surface of the mutual coupling field. According to another embodiment where the plurality of subject signal paths is on the transmit side, the reference signal is propagated from at least two antenna radiating elements to at least one antenna receiving element that is disposed at a point of substantially equipotential mutual coupling with respect to the respective mutual coupling fields of at least two of those radiating elements.

According to one embodiment, the processing being undertaken includes the counting of elapsed time; according to another embodiment, the processing being undertaken includes the ascertaining of one or more components related to at least one heterodyned product of one or more instances of the reference signal.

According to one embodiment, the characteristic of signal propagation time being measured is the absolute propagation time of a signal through the subject signal path. According to another embodiment, the characteristic being measured is relative difference in signal propagation time between two of the subject signal paths.

According to one embodiment, the method includes mixing a reference signal instance propagated through a subject signal path with a reference signal instance that is fed from the exciter. According to another embodiment, the method includes mixing a reference signal instance propagated through one of the subject signal paths with a reference signal instance propagated through another of the subject signal paths.

According to one embodiment, the reference signal includes pulse compression modulation.

According to other embodiments, the method includes adjusting propagation time of a signal through one or more subject signal paths based on a determination of at least one characteristic of signal propagation time of a signal in relation to at least one subject signal path. According to one of those embodiments, the process further includes making one or more additional adjustments to the propagation time of a signal through at least one of the subject signal paths subsequent to the first adjustment and based on additional one or more determinations of at least one characteristic of propagation time of a signal in relation to at least one of the subject signal paths made subsequent to a first determination. According to another one of those embodiments, the propagation time is adjusted to cause an instance of a signal propagating through one of the subject signal paths to complete its propagation through the system's signal path for such instance at substantially the same time as a signal instance propagating through another of the subject signal paths completes its propagation through the system's signal path for such other signal instance.

According to one embodiment, the present invention is directed to a radio frequency transmit/receive system comprising an exciter capable of producing a radio frequency reference signal, a transmit side comprising at least one transmitting signal path comprising an antenna radiating element, which transmitting signal path and antenna radiating element are usable for transmitting operational signals, a receive side comprising at least one receiving signal path comprising an antenna receiving element, which receiving signal path and antenna receiving element are usable for receiving operational signals, wherein at least one of the transmit side or the receive side comprises a plurality of said transmitting signal paths or said receiving signal paths, respectively, as subject signal paths, and wherein at least one antenna receiving element is disposed in proximity to at least one antenna radiating element permitting mutual coupling, a signal receiver capable of acquiring a signal, and analysis circuitry configured to determine based on a reference signal received from mutual coupling at least one characteristic of signal propagation time in relation to at least one of the subject signal paths.

According to one embodiment where the plurality of subject signal paths is on the receive side, at least two of the antenna receiving elements are disposed substantially along an equipotential surface of a mutual coupling field of at least one antenna radiating element. According to another embodiment where the plurality of subject signal paths is on the transmit side, an antenna receiving element is disposed at a point of substantially equipotential mutual coupling with respect to respective mutual coupling fields at least two antenna radiating elements.

According to one embodiment, the analysis circuitry is configured to determine absolute propagation time through at least one of the subject signal paths. According to another embodiment, the analysis circuitry is configured to determine relative difference in propagation times between at least two of subject signal paths.

According to one embodiment, the system includes a signal mixer disposed to mix a reference signal instance propagated through a subject signal path with a reference signal instance propagated through another subject signal path. According to another embodiment, the system includes a signal mixer disposed to mix a reference signal instance propagated through at least one of the subject signal paths with a reference signal instance fed from the exciter.

According to another embodiment, the system includes a propagation time adjustment control in communication with the analysis circuitry and also in communication with at least one propagation time adjustment mechanism disposed in a subject signal path, and capable of adjusting propagation time of a signal through at least one subject signal path.

DETAILED DESCRIPTION

Embodiments in accord with the present invention are directed to a method and system for a radio frequency transmit/receive system that employs a selected reference signal and takes advantage of the mutual coupling property of multiple antenna elements to determine aspects of propagation time of a signal through multiple parallel signal paths, here called "subject signal paths," that are also traversed by an operational signal between its generation and its reception during normal operation of the system. The generation of the reference signal and the acquisition of either the reference signal or signals derived from mixing instances of the reference signal are performed by the same exciter and receiver as are used for normal operational, permitting the aspects of signal path propagation time to be determined without the need for dedicated external measurement equipment.

Embodiments in accord with the present invention display reciprocity, that is, the methods of measurement and compensation are similar or identical whether the subject signal paths are found on the transmit side of a system with a common receiving signal path, or whether the subject signal paths are found on the receive side of a system with a common transmitting signal path. In certain embodiments, the method and system permit the calibration of one or more of the plurality of subject signal paths so that the propagation time through each of the plurality of subject signal paths is more nearly matched.

In certain embodiments of the present invention, the aspect of propagation time being determined is the absolute propagation time of a signal through a subject signal path, usually determined as part of the absolute propagation time, or a proxy for that absolute propagation time, of a signal through the full signal path of the system, including that subject signal path. The difference in propagation times can then be computed by measuring the difference between two or more absolute propagation time measurements. In certain other embodiments, the aspect of propagation time being determined is directly the relative difference in propagation time between two subject signal paths.

Figure 1:
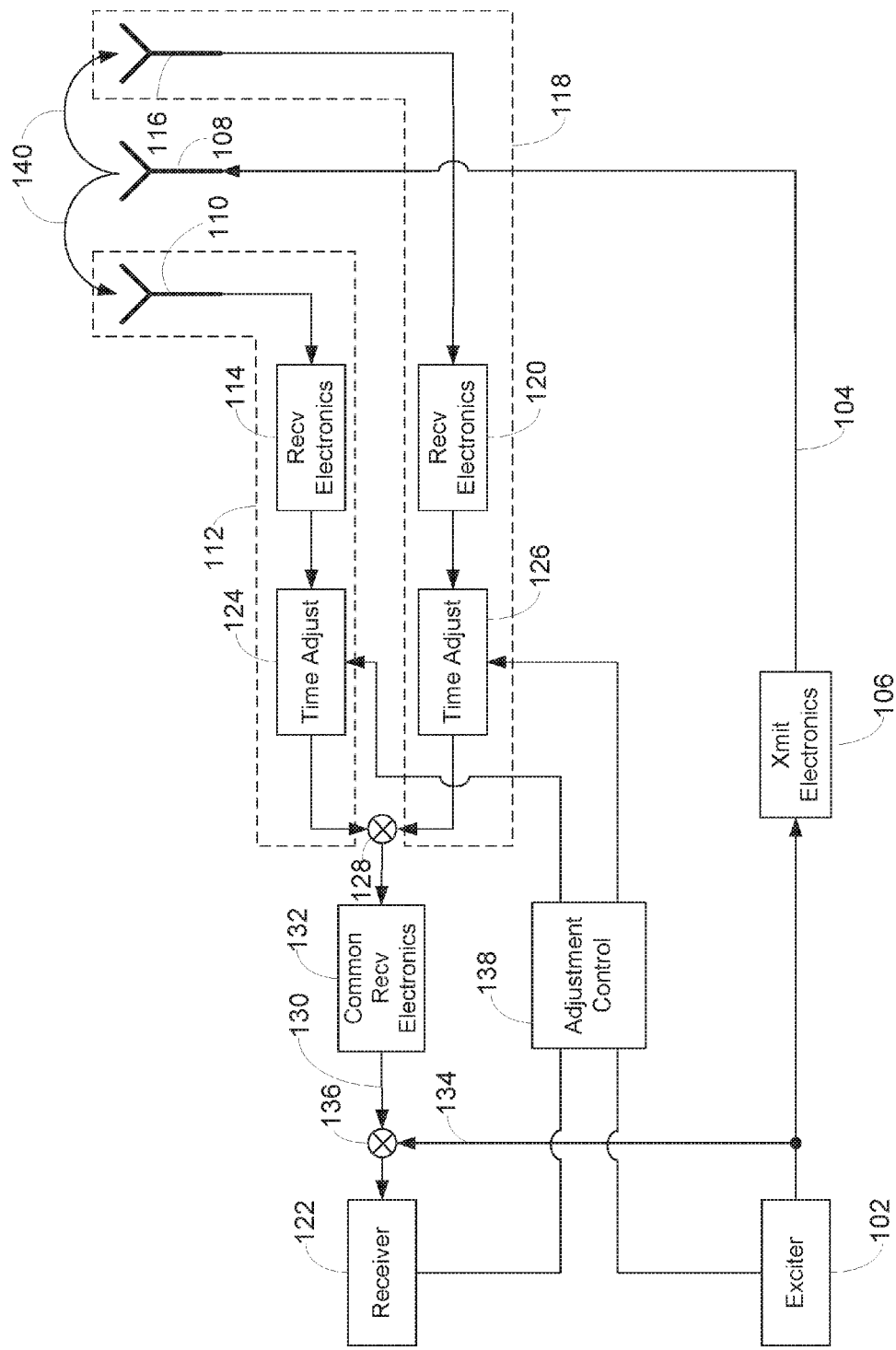
FIG. 1 is a schematic view of a radio frequency transmit/receive system according to the present invention that features a common transmitting signal path and multiple receiving signal paths.

Considering first the embodiment of the present invention featuring a common transmitting signal path and multiple receiving subject signal paths, as depicted in FIG. 1, the transmit side of the transmit/receive system comprises an exciter 102 connected to transmitting signal path 104 including any electronics 106 in that signal path and antenna radiating element 108. The system also includes first receive-side subject signal path 112 comprising antenna receiving element 110 and any electronics 114 in that subject signal path, connected to a signal receiver 122. The system further comprises at least a second receive-side subject signal path 118 comprising antenna receiving element 116 and any electronics 120 in that signal path, also connected to receiver 122. Both antenna receiving elements are disposed in the mutual coupling field 140 of the antenna radiating element. Although two receive-side subject signal paths are depicted in FIG. 1, additional subject signal paths beyond two may be attached to the receiver and have their signal propagation time measured and/or calibrated, with the antenna receiving element for each such subject signal path also within the mutual coupling field 140.

In embodiments comprising additional optional components, propagation time adjustment mechanisms 124, 126 may be disposed in one or more of the receive-side subject signal paths. The system may also feature an adjustment control 138 connected to exciter 102 and receiver 122, and connected to the propagation time adjustment mechanisms 124 and 126 to control them. Further, the multiple subject signal paths may each feed a mixer 128. The multiple subject signal paths may also share a common receive-side signal path 130 including any electronics 132 in that common signal path. Moreover, the subject signal paths 112, 118 or common signal path 130 may feed a mixer 136 that is also fed by a local oscillator feed line 134 from the exciter.

The terms "attached," "connected," "feed" or "fed" as used here may include any form of the two referenced items being in communication with each other, such as direct or indirect electrical, electronic, optical, RF, or waveguide connection, or any other form of attachment or association that promotes signal or data communication. It should also be noted that the exciter, mixers, receiver, adjustment control, and other electronics may be implemented in and operate in the analog and/or digital domain, using specialized electrical and/or optical circuitry, mechanical members, special purpose computers, ASICs and/or firmware, general purpose computers programmed with special purpose software, or any other media usable for signal or data conduction and processing.

Figure 3:
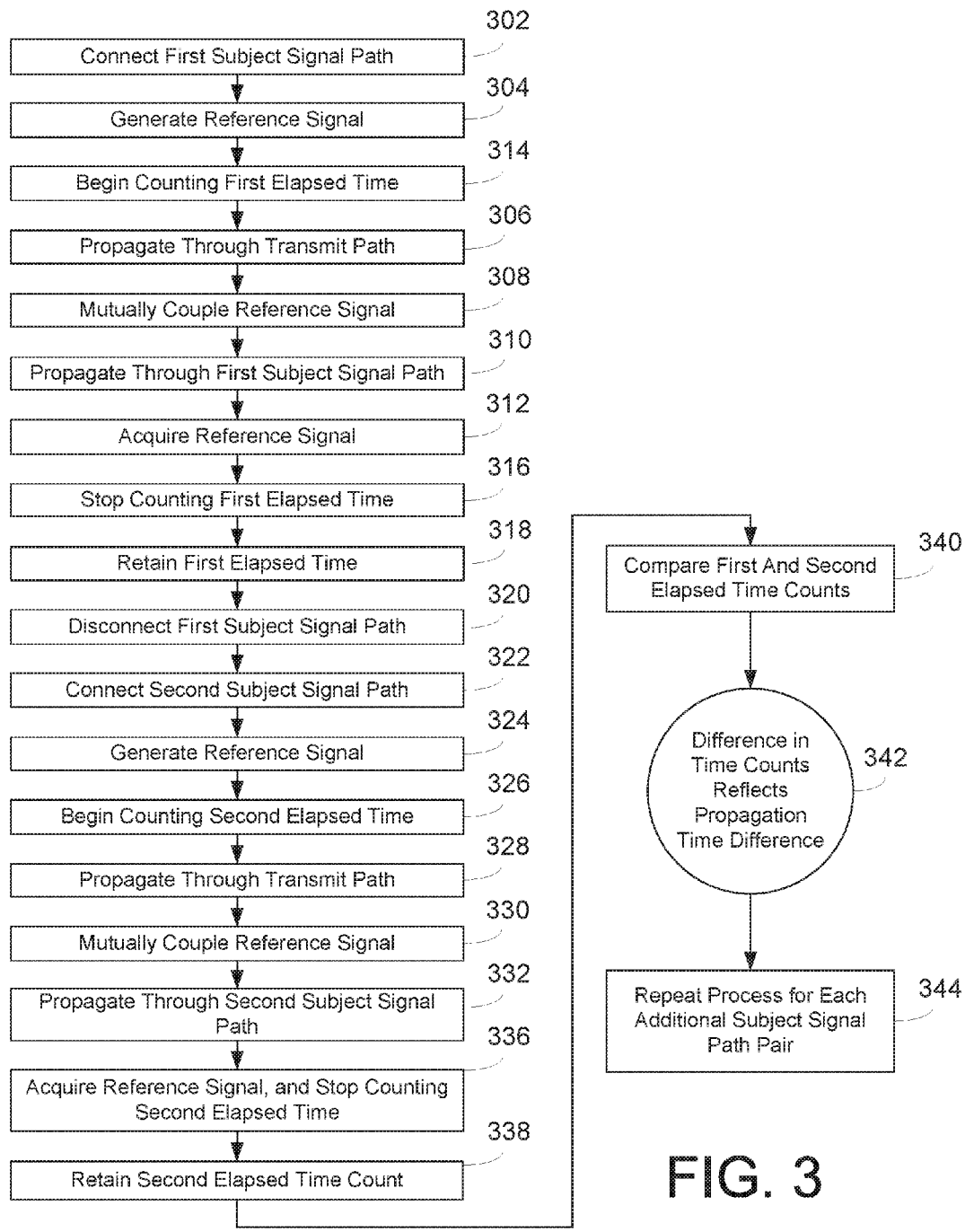
FIG. 3 is a flow chart outlining a method according to the present invention for measuring the propagation times of various receive-side subject signal paths in a radio frequency transmit/receive system by counting absolute elapsed time while a reference signal instance propagates through the system signal path.

According to one embodiment of a method for implementing the present invention in a radio frequency transmit/receive system having multiple receive-side subject signal paths, as depicted in FIG. 3, a first receive-side subject signal path 112 is connected (302) to the signal receiver or otherwise enabled to receive a signal. A reference signal with appropriate properties that enable observation of small differences in time is generated (304) by the system exciter 102. This signal is propagated (306) through the transmitting signal path 104, any signal path electronics 106, and antenna radiating element 108. The majority of the signal is radiated into space, but a small portion is mutually coupled (308) from radiating element 108 through mutual coupling field 140 into antenna receiving elements 110 and 116. The mutually coupled signal propagates (310) through first subject signal path 112, including through receiving element 110 and any electronics 114 of that subject signal path, and into signal receiver 122 where it is acquired (312). In this embodiment, the absolute propagation time through the system is measured. Upon the exciter emitting the reference signal, the system begins measuring (314) elapsed time, such as by counting the pulses of the system clock, and ceases (316) measuring or counting when receiver 122 acquires the reference signal. The total elapsed time measurement, such as the accumulated clock pulse count, is retained (318) as a measure of signal propagation time from exciter to receiver through the first subject signal path.

The first subject signal path is disconnected (320) from the signal receiver or otherwise disabled from receiving a signal, and a second subject signal path 118 is connected (322) to the signal receiver or otherwise enabled to receive a signal. Another instance of the reference signal is emitted (324) from the exciter and another measurement of elapsed time begins (326). The reference signal propagates (328) through the transmitting signal path, and propagates (330) across the mutual coupling field. The mutually coupled signal propagates (332) through second subject signal path 118, including receiving element 116 and any electronics 120 of that subject signal path, and into signal receiver 122 where it is acquired and the measurement of elapsed time is terminated (336), and the elapsed time measurement for the second subject signal path is retained (338). The difference in propagation time can be determined by comparing (340) the elapsed propagation time through the system with each of the respective subject signal paths connected. In the case of counting system clock pulses, this comparison is as simple as subtracting one pulse count from the other pulse count. Since the propagation time through the rest of the total signal path other than the subject signal paths is the same in each instance, any difference in the elapsed total propagation times corresponds (342) to the difference in the propagation times between the two subject signal paths. As many additional subject signal paths as desired may be connected and the actions of transmitting, receiving, and elapsed time measuring may be repeated (344) for each, to determine their propagation times and relative propagation time differences. It should be noted that the above need not necessarily be performed in the exact order discussed here.

In any propagation time measurement method, it is necessary for the exciter to be able to generate a reference signal waveform and the receiver to be able to receive such a waveform that renders the salient characteristics of propagation time as observable quantities. Optimally, a waveform should be selected that lies within the transmit and receive capability of the system hardware without exceeding or straining the optimal capabilities of the exciter and receiver subsystems. Many waveforms capable of yielding suitable resolution regarding propagation time are known to those skilled in the art, but the optimal type of signal depends on the measurement method being employed. Direct counting of elapsed time as exemplified by the embodiment just discussed requires a highly resolvable signal, such as a single, very short pulse of high frequency. The duration of such a pulse is related to the desired resolution and precision of measurement and compensation. Measurement and compensation corresponding to distance resolution of about a foot would require a pulse duration of approximately a nanosecond. Moreover, a typical propagation time calibration requirement in systems where supplemental phase alignment circuitry is available might be to within one wavelength of the system's center frequency, which would correspond, for example, to 100 picoseconds at 10 GHz. In systems where beam formation is implemented without such phase-shift supplementation, the pulse duration for a system using such a center frequency would need to be even more brief, on the order of 1 picosecond. Such ultra-brief pulse durations may severely tax the abilities of the exciter and receiver or even be impossible to achieve. It may also be difficult for the receiver to detect such an ultra-brief pulse amidst noise or interference. For systems using exciters and receivers of limited capability, these difficulties may render the approach of directly counting elapsed time less than optimal.

Fortunately, longer-period reference signals that are easier to transmit and receive may be also used, in combination with pulse compression techniques that are known to those skilled in the art. Such signals may for example feature pulse compression modulation such as frequency modulated chirp, stepped frequencies, random code, or multi-chip Barker code, with the parameters of such signals selected to yield the desired time measurement resolution.

An additional advantage of using a pulse compression modulation such as a very fast-ramping linear frequency-modulated chirp waveform, beyond its usability with pulse compression techniques, is that mixing two instances of such a chirp having different time phase produces heterodyne frequencies that directly correspond to the time offset between the two signal instances. Specifically, dividing the mix-product frequency offset by the frequency ramp rate yields the difference in time between the two instances. This allows an embodiment mixing time-offset instances of such a chirp signal to determine a time difference between them simply by observing the resultant signal frequencies rather than by measuring elapsed time.

Figure 4:
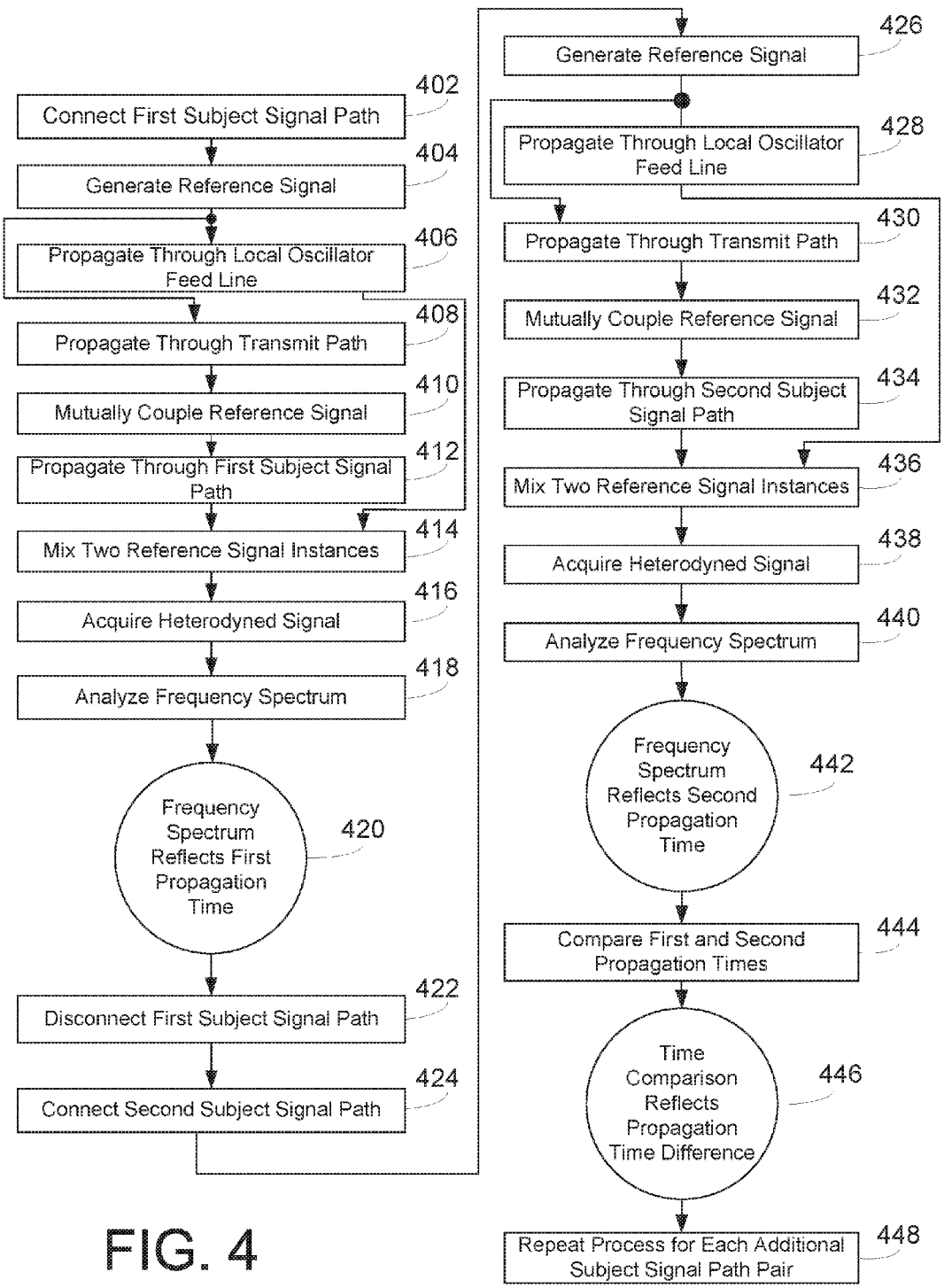
FIG. 4 is a flow chart outlining a method according to the present invention for measuring the propagation times of various receive-side subject signal paths in a radio frequency transmit/receive system by mixing a local oscillator reference signal instance with a reference signal instance propagated through the system signal path.

In an embodiment using the mixing of a chirp-type reference signal and observation of the heterodyned results, as depicted in FIG. 4, the first receive-side subject signal path 112 is connected (402) to the signal receiver 122 or otherwise enabled to receive a signal. When the reference signal is emitted (404) by the exciter 102, it is propagated (408) to the transmitting signal path 104 and also propagated (406) through a local oscillator feed line 134 to a signal mixer 136 in the receiving signal path. The reference signal propagates (408) through the transmitting signal path, propagates (410) across the mutual coupling field 140, and propagates (412) through the first subject signal path 112 into the other input of mixer 136, where the propagated reference signal instance and the local oscillator feed signal instance are mixed (414). The heterodyned signal from the mixer is acquired (416) by the receiver 122, and its frequency profile is analyzed (418) to determine the difference in arrival time of the respective signal instances at the mixer. That frequency profile correlates (420) with signal propagation time through the system including the first subject signal path.

The first receive-side subject signal path 112 is disconnected (422) from signal receiver 122 or otherwise disabled from receiving a signal, and the second receive-side subject signal path 118 is connected (424) to signal receiver 122 or otherwise enabled to receive a signal. When the reference signal is emitted (426) by the exciter 102, it is propagated (430) through the transmitting signal path 104 and also propagated (428) through local oscillator feed line 134 to signal mixer 136 in the receiving signal path. The reference signal propagates (432) across the mutual coupling field 140, and propagates (434) through the second subject signal path 118 into the other input of mixer 136, where the propagated reference signal instance and the local oscillator feed signal instance are mixed (436). The heterodyned signal is acquired (438) by the receiver 122, and its frequency profile is analyzed (440) to determine the difference in arrival time of the respective signal instances at the mixer. That frequency profile correlates (442) with signal propagation time through the system including the second subject signal path.

The difference in propagation time between the two subject signal paths can be determined by comparing (444) the elapsed propagation time through the system with each of the respective subject signal paths connected. Since the propagation time through the rest of the total signal path other than the subject signal paths is the same in each instance, any difference in the determined total system signal propagation times corresponds (446) to the difference in the propagation times between the two subject signal paths. As many additional subject signal paths as desired may be connected and the actions of transmitting, receiving, and elapsed time measuring may be repeated (448) for each to determine their propagation times and relative propagation time differences. It should be noted that the above need not necessarily be performed in the exact order discussed here.

Figure 5:
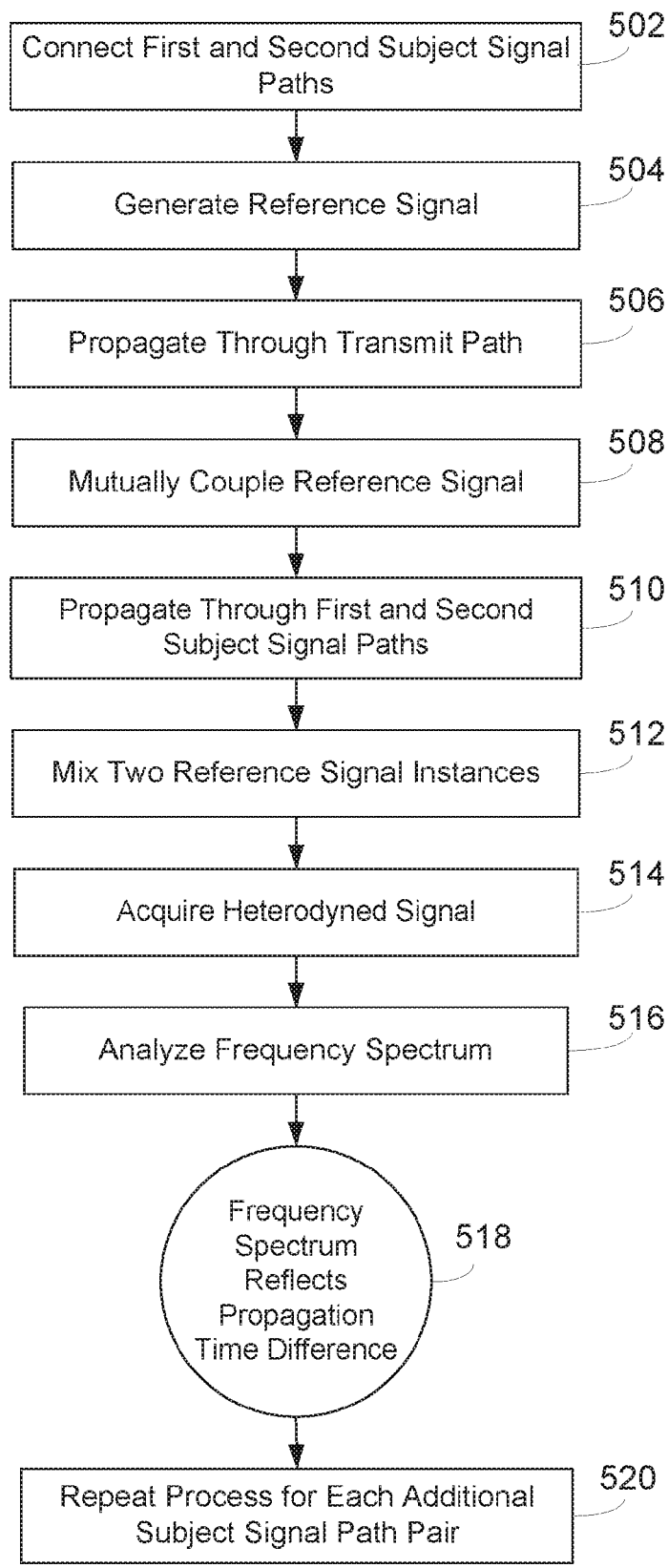
FIG. 5 is a flow chart outlining a method according to the present invention for measuring the relative difference in propagation times between various receive-side subject signal paths in a radio frequency transmit/receive system by mixing reference signal instances propagated through various subject signal paths.

In another embodiment that uses the mixed and heterodyned signal approach, instead of making a separate measurement to determine the signal propagation time for each subject signal path, the difference in propagation times between two different receive-side subject signal paths is determined directly, from a single measurement. This embodiment does not require a local oscillator feed line. Instead, as depicted in FIG. 5, two receive-side subject signal paths 112, 118 are connected (502) to receive a signal simultaneously, each subject signal path feeding an input of mixer 128. In this embodiment, the reference signal is emitted (504) from the exciter, propagates (506) through the transmitting signal path, and propagates (508) across the mutual coupling field 140. The mutually coupled signal propagates (510) through both the first subject signal path 112 and the second subject signal path 118, and the signal instances flowing through those two subject signal paths are mixed (512) at mixer 128. The heterodyned signal from the mixer is acquired (514) by the receiver 122, and the heterodyne frequency products of the mix of reference signal instances as received through the two subject signal paths are analyzed (516) to determine the difference in arrival time at the mixer of the signal instances fed through the two subject signal paths respectively, which difference corresponds (518) to the relative difference in propagation time between the two subject signal paths. As many additional subject signal paths pairs as desired may be connected and the actions of transmitting, receiving, mixing and analyzing may be repeated (520) for each such pair to determine the relative propagation time differences between such pair. It should be noted that the above need not necessarily be performed in the exact order discussed here. In contrast to the information derived in the previously discussed approaches involving absolute propagation time through the system, since this embodiment's approach involves only relative difference in propagation time, the information that cannot be gleaned from a single examination of the mixed signal in this approach is which of the subject signal paths features the shorter signal propagation time and which subject signal path features the longer one; additional action, such as the trial adjustment of subject signal path propagation time discussed below, is necessary to yield that information.

In another embodiment of the present invention involving multiple receive—side subject signal paths, the system comprises propagation time adjustment control circuitry 138 connected to exciter 102, receiver 122, and propagation time adjustment mechanisms 124, 126 that are deposed in one or more of the subject signal paths. In this embodiment, the differences in propagation times between two or more subject signal paths may be used by the propagation time adjustment control circuitry to adjust the propagation time adjustment mechanisms. All subject signal paths may feature such a propagation time adjustment mechanism, or a subject signal path featuring such a propagation time adjustment mechanism may be adjusted to match the propagation time of a subject signal path side that does not feature such a propagation time adjustment mechanism.

Figure 6:
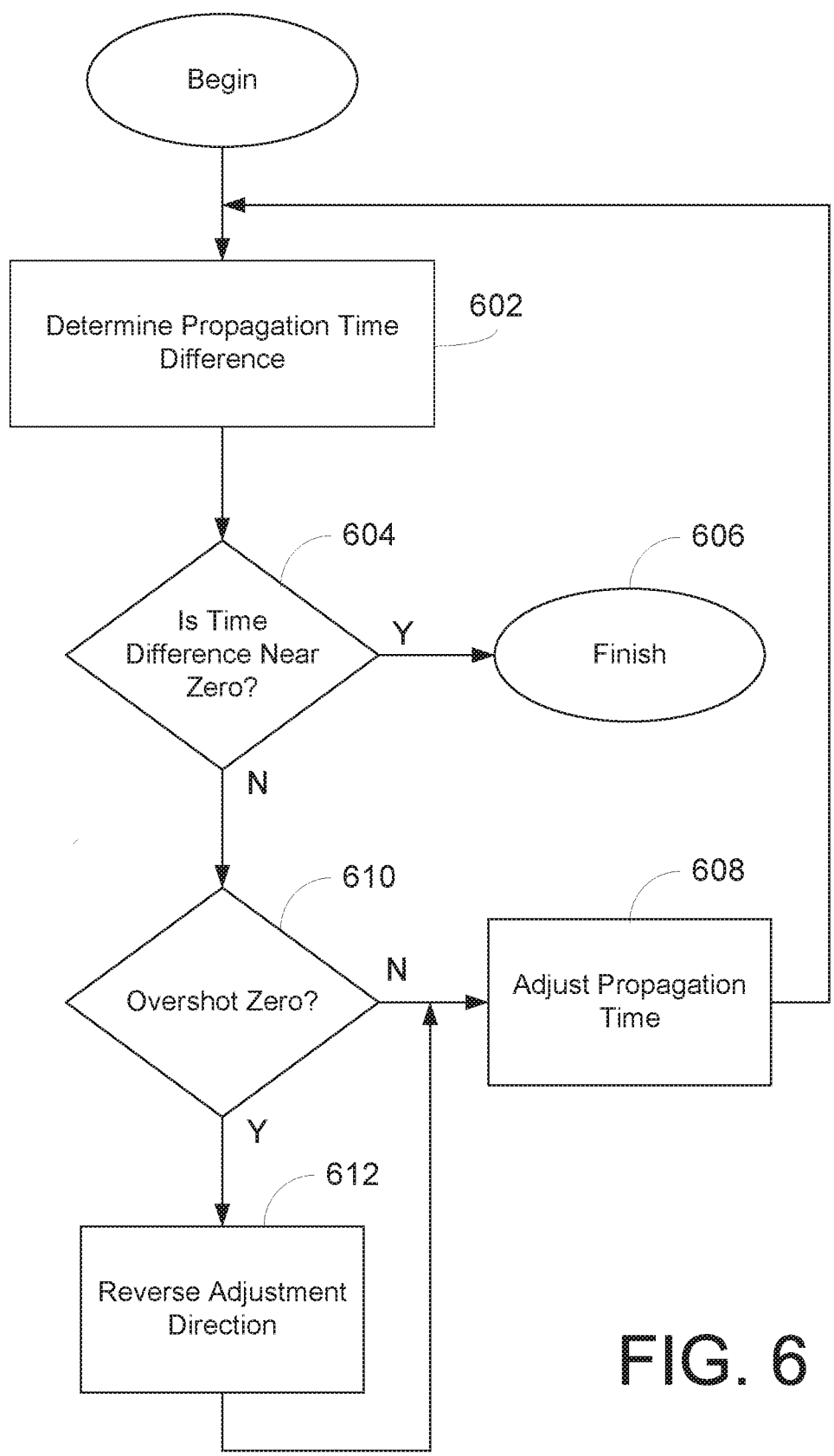
FIG. 6 is a flow chart outlining a method according to the present invention for measuring propagation time differences among various subject signal paths and calibrating those paths to reduce those propagation time differences in a radio frequency transmit/receive system where the direction of those differences is originally known.

In an embodiment involving propagation time calibration and that determines the absolute propagation time through a subject signal path, as depicted in FIG. 6, the adjustment starts with measuring and determining (602) the relative propagation time difference between a pair of subject signal paths based on their respective absolute propagation times. If the adjustment control circuitry decides (604) that the time difference is sufficiently near zero, that is, if it is small enough to yield a level of calibration that is desired or practical, the calibration process terminates (606). If the difference is not sufficiently small, the adjustment control circuitry adjusts (608) the appropriate propagation time adjustment mechanism in at least one of the subject signal paths to alter the propagation time in that subject signal path or those subject signal paths in a direction that will reduce the difference. The process then repeats, performing again the time difference determination (602) to see if the adjustment has brought the system within optimal parameters. If it has not, the adjustment and measurement are repeated. The process may also include a decision (610) whether the most recent adjustment has caused the system to overshoot a zero time difference and begin to suffer a propagation time difference in the other direction, in which case before making the next adjustment (608) the direction of adjustment is reversed (612), either by reversing the direction of adjustment to the propagation time adjustment mechanism in the currently addressed subject signal path, or by switching to address in the same adjustment direction the propagation time adjustment mechanism in the other subject signal path. It should be noted that the above need not necessarily be performed in the exact order discussed here.

Figure 7:
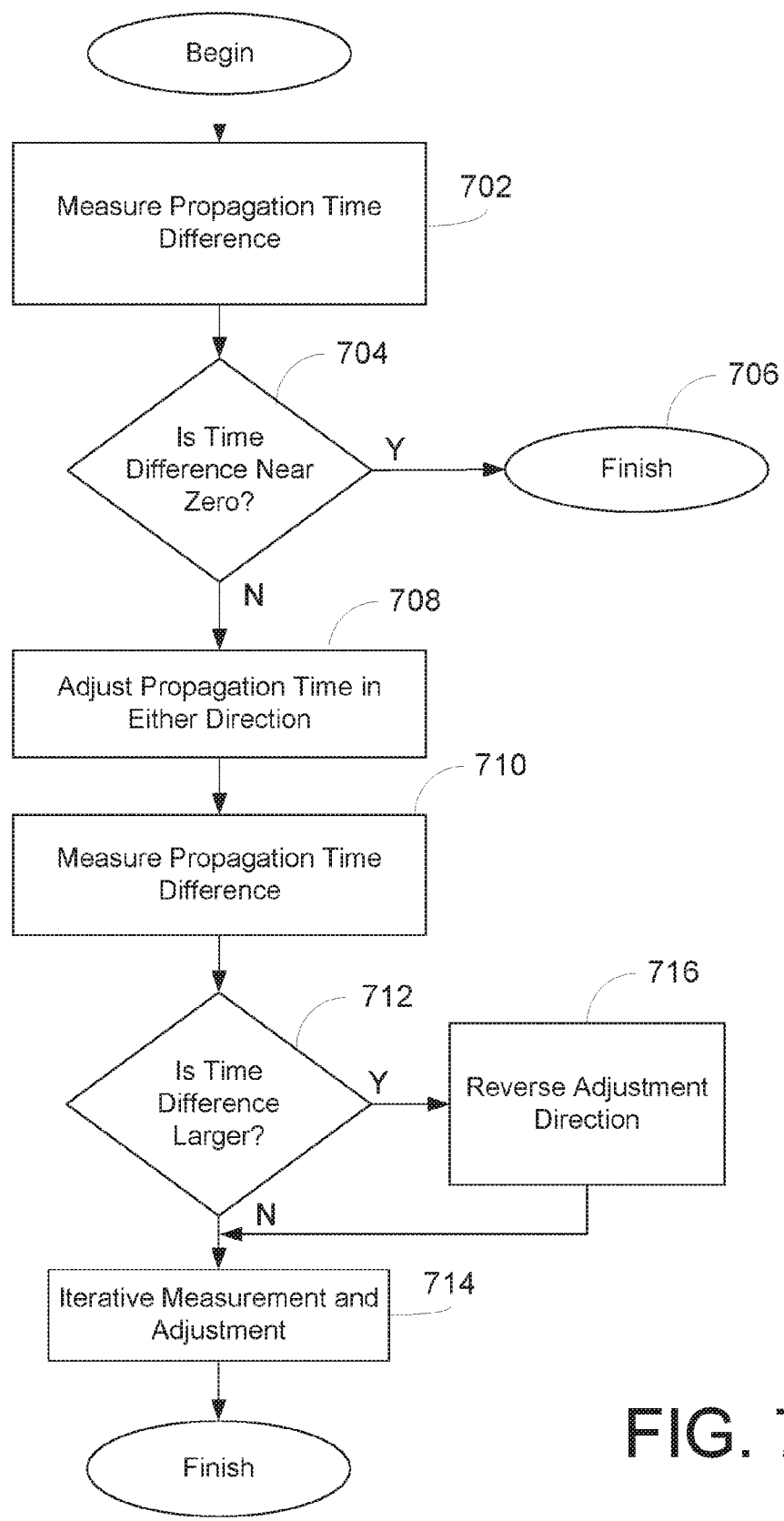
FIG. 7 is a flow chart outlining a method according to the present invention for measuring propagation time differences among various subject signal paths and calibrating those paths to reduce those propagation time differences in a radio frequency transmit/receive system where the direction of those differences is not originally known.

In an embodiment involving propagation time calibration in which an absolute elapsed time is counted, or in which the difference between each respective subject signal path is determined by mixing signals separately from respective subject signal paths with a local oscillator feed line, the system can determine immediately which subject signal path has the shorter signal propagation time and which subject signal path has the longer one, and the appropriate propagation time adjustment mechanism may be adjusted accordingly. However, in the approach where the signals propagated through various subject signal paths are mixed with each other, only the size of the relative time difference can be determined by analyzing the frequency profile of the mixed signal, and not which of the subject signal paths features the shorter signal propagation time and which subject signal path features the longer one. Therefore, it can not be known in advance in which direction a propagation time adjustment mechanism should be adjusted. In this situation, as depicted in FIG. 7, the system begins as in the prior embodiment, by determining (702) the propagation time difference, deciding (704) whether that difference is sufficiently small, and finishing (706) if it is. If it is not sufficiently small, a small trial adjustment (708) is made in either direction arbitrarily to a propagation time adjustment mechanism, the measurement process is repeated (710), and the system decides (712) whether the trial adjustment was in the correct direction and made the time difference smaller, or whether it was in the incorrect direction and made the time difference larger. If the trial adjustment decreased the propagation time difference, further iterative measurement and adjustment (714) is performed in that same direction to reduce the time difference toward zero. If, however, the trial adjustment increased the propagation time difference, the direction of the adjustment is reversed (716) before the system begins the further iterative measurement and adjustment process (714). It should be noted that the above need not necessarily be performed in the exact order discussed here.

The result of the trial adjustment also yields information regarding which of the two subject signal paths currently possesses the shorter propagation time and which possesses the longer propagation time. This is so because the system will then have the information on which subject signal path was adjusted, in which direction it was adjusted, and whether that adjustment led to a smaller or larger difference in the propagation times between the two. This information regarding which subject signal path has the longer propagation time is useful for example in a situation where the propagation time difference is not being nulled to zero, but is instead being set to some non-zero point. This may be the case for example where the antenna element of each subject signal path is not located along the same equipotential surface of the mutual coupling field, as discussed below, and so a compensating factor must be applied to cause the signal instances through the respective subject signal paths to arrive at the receiver more closely coincident in time.

Any of the adjustment processes described herein for a particular pair of subject signal paths may be repeated for additional pairs of subject signal paths that feature propagation time adjustment mechanisms, in order to match the propagation time among all the subject signal paths. One way to achieve this is to set one subject signal path as the standard for comparison, pair that standard path with each of the other subject signal paths in turn, and measure and calibrate each of those other subject signal paths to match its propagation time to the propagation time of the standard path.

Regarding disposition of the plurality of antenna receiving elements with respect to the mutual coupling field of the antenna radiating element, perhaps the simplest arrangement is to dispose each of the receiving elements along an equipotential surface in the mutual coupling field, so that the phase, amplitude, and time delay of the signal from the radiating element is the same for each of the receiving elements across the frequency range of interest. However, if the transfer function of the radiating element is known, the receiving elements could be disposed within any location in the mutual coupling field, and the transfer function applied to the analysis of the relative difference in propagation times to compensate for any contribution to the difference from disparate placement of the receiving elements in the mutual coupling field.

Figure 2:
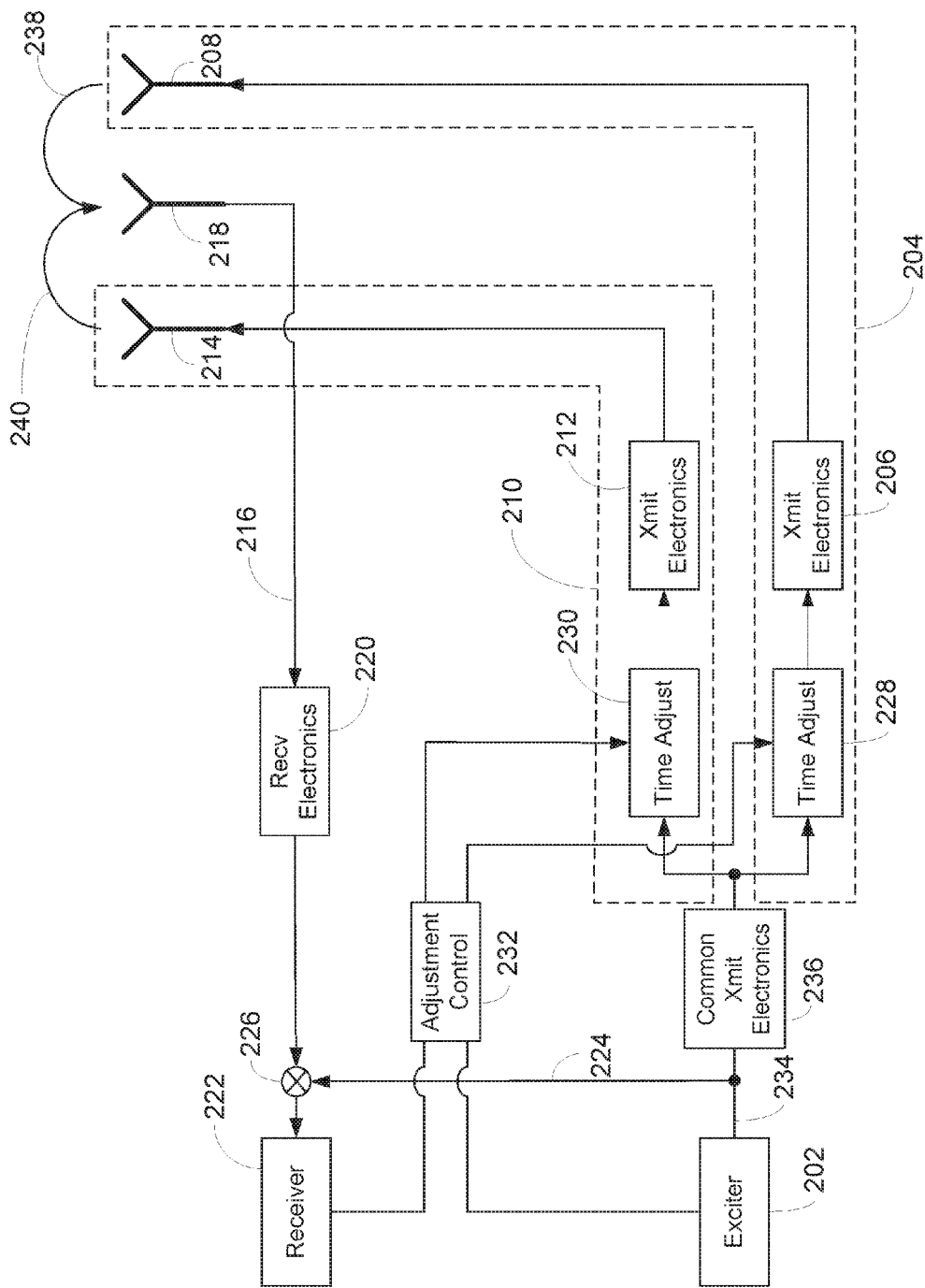
FIG. 2 is a schematic view of a radio frequency transmit/receive system according to the present invention that features multiple transmitting signal paths and a common receiving signal path.

The present invention is equally useful for systems featuring a plurality of subject signal paths on the transmit side of the system as for those with a plurality of subject signal paths on the receive side of the system. Considering next an embodiment of the present invention featuring multiple transmit-side subject signal paths and a common receive path, as depicted in FIG. 2, the transmit side of the transmit/receive system comprises an exciter 202, which feeds a first transmit-side subject signal path 204 comprising any electronics 206 in that signal path and antenna radiating element 208. Exciter 202 also feeds at least a second transmit-side subject signal path 210 comprising any electronics 212 in that signal path and antenna radiating element 214. The system also comprises receiving signal path 216, including antenna receiving element 218 and any electronics 220 in that signal path, and further comprises a signal receiver 222. The antenna receiving element 218 is disposed in both the mutual coupling field 238 of antenna radiating element 208 and the mutual coupling field 240 of antenna radiating element 214. Although two transmit-side subject signal paths are depicted in FIG. 2, additional subject signal paths beyond two may be fed by the exciter and have their signal propagation time measured and/or calibrated, with the common antenna receiving element also within the mutual coupling field of the antenna radiating elements associated with such additional subject signal paths.

In embodiments comprising additional optional components, propagation time adjustment mechanisms 228, 230 may be disposed in one or more of the transmit-side subject signal paths. The system may also feature an adjustment control 232 connected to exciter 202 and receiver 222, and connected to the propagation time adjustment mechanisms 228 and 230 to control them. The multiple subject signal paths may also share a common transmit-side signal path 234, including any electronics 236 in that signal path. The receive-side signal path 216 may feed a mixer 226 that is also fed by a local oscillator feed line 224 from the exciter.

The terms "attached," "connected," "feed" or "fed" as used here may include any form of the two referenced items being in communication with each other, such as direct or indirect electrical, electronic, optical, RF, or waveguide connection, or any other form of attachment or association that promotes signal or data communication. It should also be noted that the exciter, mixers, receiver, adjustment control, and other electronics may be implemented in and operate in the analog and/or digital domain, using specialized electrical and/or optical circuitry, mechanical members, special purpose computers, ASICs and/or firmware, general purpose computers programmed with special purpose software, or any other media usable for signal or data conduction and processing.

Figure 8:
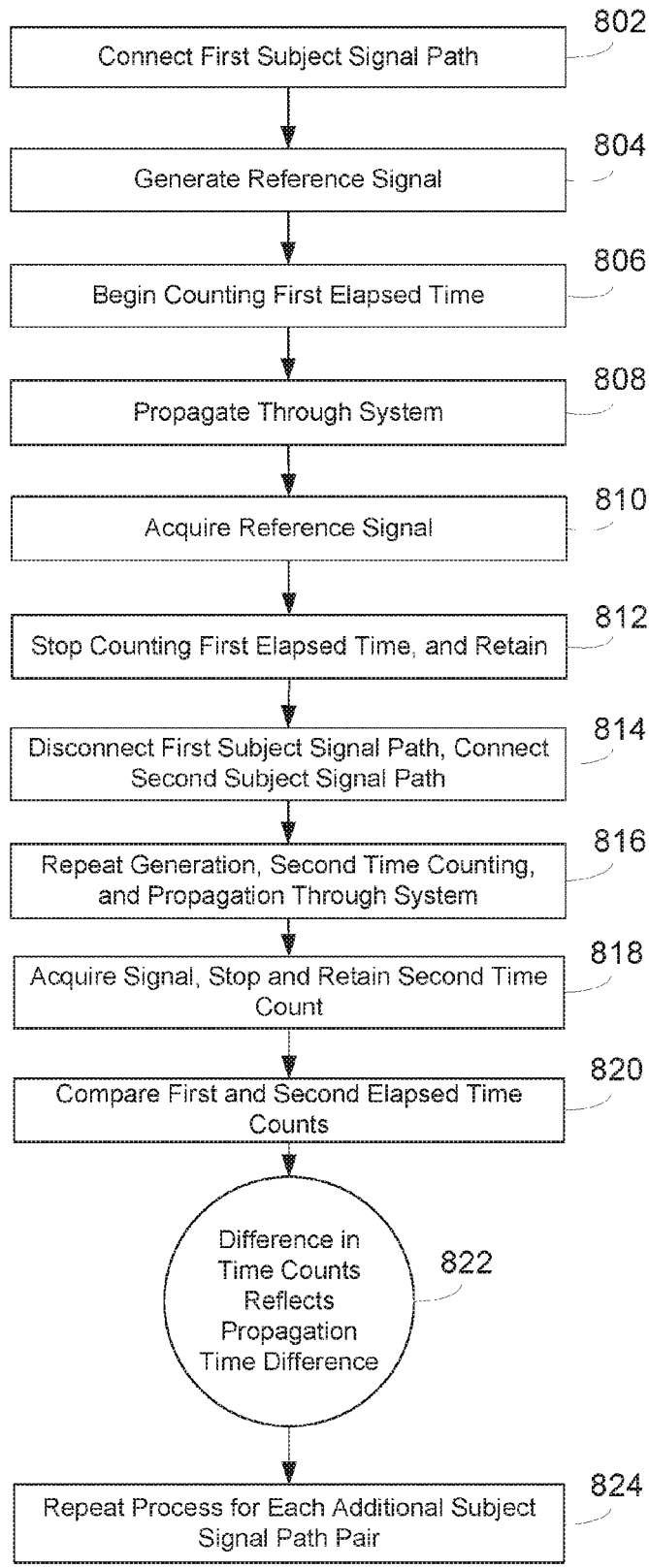
FIG. 8 is a flow chart outlining a method according to the present invention for measuring the propagation times of various transmit-side subject signal paths in a radio frequency transmit/receive system by counting absolute elapsed time while a reference signal instance propagates through the system's full signal path.

An embodiment of a method for implementing the present invention in a radio frequency transmit/receive system having multiple transmit-side subject signal paths is depicted in FIG. 8. This method is conceptually similar to the method depicted in FIG. 3 involving a system with multiple receive-side subject signal paths, and FIG. 8 is sketched in brief to show the parallels to and any differences from the method in FIG. 3. According to this embodiment, a first transmit-side subject signal path 204 is connected (802) to the exciter 202 or otherwise energized to propagate a signal, a reference signal with appropriate properties that enable observation of small differences in time is generated (804) by the system exciter, and the system begins (806) counting elapsed time.

The signal propagates (808) through the system signal path of the connected subject signal path 204 including any electronics 206 and its antenna radiating element 208, across the mutual coupling field 238 into antenna receiving element 218, through the receive side signal path 216 and into the signal receiver 222, where it is acquired (810), and the system ceases (812) counting and retains the counted elapsed time.

The first transmit-side subject signal path 204 is disconnected or de-energized and second transmitting signal path 210 is connected or energized (814). The generation and propagation of the signal through the system and the counting of elapsed time is repeated (816), with the reference signal from the exciter propagating through the second transmitting signal path 210, including any electronics 212 and its antenna radiating element 214, propagating across the mutual coupling field 240 to receiving element 218, and propagating through the receive side signal path 216 and into the signal receiver 222, where the signal is acquired and the total elapsed time count is stopped and retained (818). As with a system involving receive-side subject signal paths, the difference in propagation time can be determined by comparing (820) the elapsed propagation time through the system with each of the respective subject signal paths connected, with any difference in the elapsed total propagation times corresponding (822) to the difference in the propagation times between the two subject signal paths. As many additional transmit-side subject signal paths as desired may be connected and the transmitting, receiving, and elapsed time measuring may be repeated (824) for each. It should be noted that the above need not necessarily be performed in the exact order discussed here.

Figure 9:
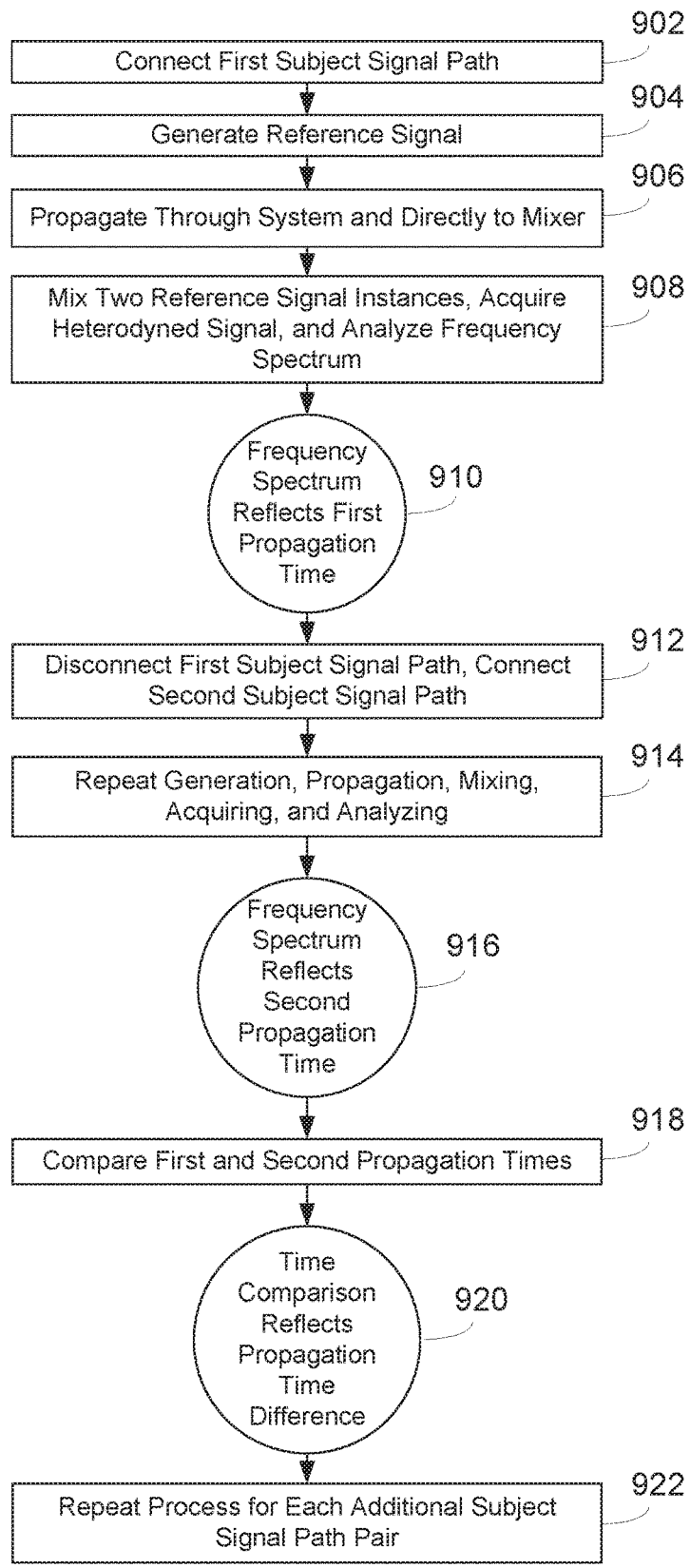
FIG. 9 is a flow chart outlining a method according to the present invention for measuring the propagation times of various transmit-side subject signal paths in a radio frequency transmit/receive system by mixing a local oscillator reference signal instance with a reference signal instance propagated through the system signal path.

As with the embodiments involving receive-side subject signal paths, other embodiments using mixed and heterodyned signals may be applied to systems with multiple transmit-side subject signal paths. One such embodiment is depicted in FIG. 9. The process used with this embodiment is conceptually similar to the receive-side process depicted in FIG. 4; FIG. 9 is sketched in brief to show the parallels to and any differences from the method depicted in FIG. 4. In this embodiment, the first transmit-side subject signal path 204 is connected (902) to the exciter 202 or otherwise enabled to transmit a signal. The reference signal is emitted (904) by the exciter 202, and it is propagated (906) both through the first subject signal path 204, across mutual coupling field 238, and through receive side signal path 216 to one input of signal mixer 226, and also through local oscillator feed line 224 to the other input of mixer 226. The signal instances are (908) mixed in the mixer, the heterodyned result acquired by receiver 222, and its frequency profile analyzed to determine the difference in arrival time of the respective signals at the mixer, which corresponds (910) to the signal propagation time through the total system with the first subject signal path connected. The first transmitting subject signal path 204 is disconnected or de-energized and second transmitting subject signal path 210 is connected or energized (912), the signal generation, propagation to the mixer of the signal instances propagated through the system and also from the exciter, heterodyning of the signal instances, and acquiring and analysis of the heterodyned signal is repeated (914), and the frequency profile corresponds (916) to the signal propagation time through the total system with the second subject signal path connected. Comparing (918) the propagation time through the system with each of the respective subject signal paths connected corresponds (920) to the difference in propagation time between the two subject signal paths. It should be noted that the above need not necessarily be performed in the exact order discussed here.

Figure 10:
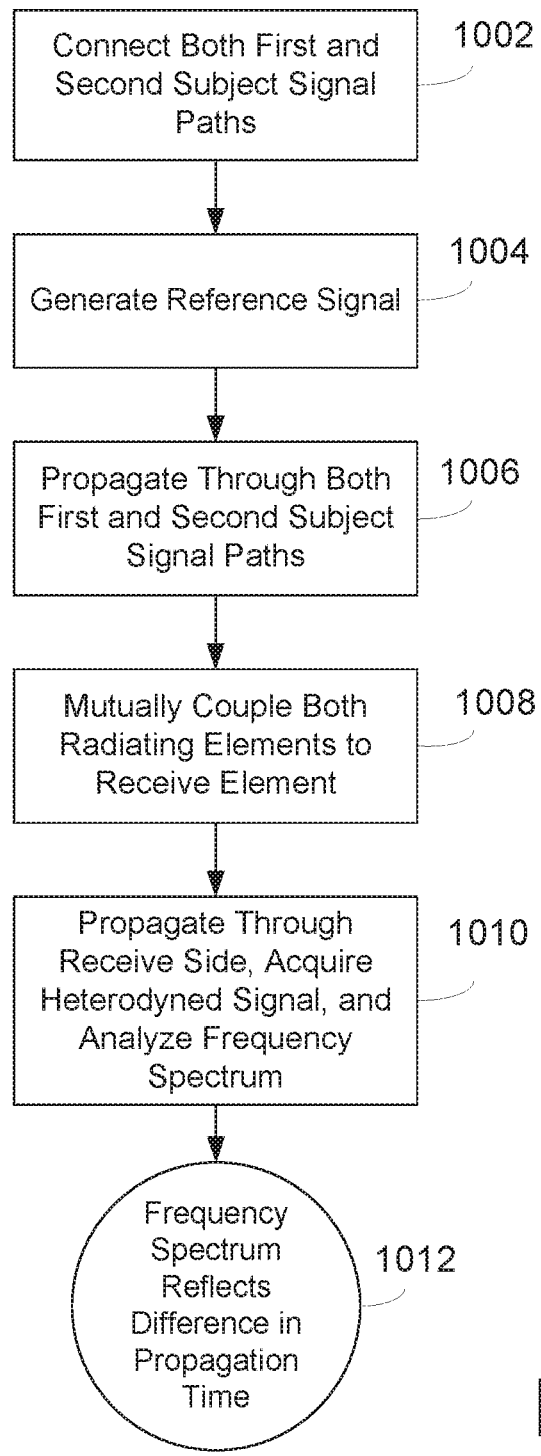
FIG. 10 is a flow chart outlining a method according to the present invention for measuring the relative difference in propagation times between various transmit-side subject signal paths in a radio frequency transmit/receive system by mixing reference signal instances propagated through various subject signal paths.

In another embodiment that uses the mixed and heterodyned signal approach in connection with a system having multiple transmit-side subject signal paths, the difference in propagation times between two different subject signal paths is determined directly from a single measurement. The process used with this embodiment is depicted in FIG. 10, and is conceptually similar to the receive-side process depicted in FIG. 5; FIG. 10 is sketched in brief to show the parallels to and any differences from the method depicted in FIG. 5. This embodiment does not require a local oscillator feed line or receive-side mixer. Instead, both of the transmit-side subject signal paths 204 and 210 are connected (1002) to transmit the reference signal. The reference signal is generated (1004) by exciter 202 and propagates (1006) through both first subject signal path 204 and second subject signal path 210, resulting in the antenna radiating elements 208 and 214 both mutually coupling (1008) the reference signal into the receiving element 218. A mixer circuit is not required to mix the instances of the reference signal radiated by the multiple radiating elements in this embodiment, because the mixing occurs in the mutual coupling field. The mixed and heterodyned reference signal propagates (1010) through the receive side signal path 216, is acquired by receiver 222, and its frequency products are analyzed to determine the difference in arrival time at the receiving element 218 of the signals fed through the two transmitting subject signal paths. That frequency profile corresponds (1012) to the difference in signal propagation times between the two transmit-side subject signal paths. As with the similar embodiment involving receive-side subject signal paths, since this embodiment's approach involves only relative differences in propagation time, the information that cannot be gleaned from a single observation of the mixed signal in this approach is which of the subject signal paths features the shorter signal propagation time and which subject signal path features the longer one, and that determination requires further action, for example as described herein involving trial propagation time adjustments. It should be noted that the above need not necessarily be performed in the exact order discussed here.

In another embodiment of the present invention involving a radio frequency transmit/receive system having multiple transmit-side subject signal paths, a propagation time adjustment mechanism 228, 230 may be disposed in one or more of the transmit-side subject signal paths. The system may also feature an adjustment control system 232 connected to exciter 202 and receiver 222, and connected to the propagation time adjustment mechanisms 228, 230 to control them. The considerations, configurations, and methods for using the measured relative difference in propagation time to calibrate transmit-side subject signal paths are the same as those discussed above in relation to calibrating receive-side subject signal paths, and will not be repeated here.

Regarding disposition of the plurality of antenna radiating elements and their mutual coupling fields with respect to the common antenna receiving element, perhaps the simplest arrangement is to dispose each of the each of the radiating elements so that the receiving element is at an equipotential point in each of the mutual coupling fields, such that the phase, amplitude, and time delay of the signals from each of the radiating elements is the same for the receiving element across the frequency range of interest. However, if the transfer functions of the radiating elements are known, the receiving element could be disposed within any location in the respective mutual coupling fields, and the transfer functions applied to the analysis of the relative difference in propagation times to compensate for any contribution to the difference from the receiving element's various positioning with respect to the mutual coupling fields of the various antenna radiating elements.

Notably, the mixers in any of the embodiments discussed herein or in other embodiments need not be mechanisms separate from the receiver; the receiver may acquire the plurality of signals individually and mix them either in the analog domain or digitally as part of its operation. The system may further perform in either the analog or digital domain any necessary or desirable signal processing or signal analysis regarding an acquired signal, for example generation and processing of a cross-correlation function for Barker code analysis. Such signal processing may be performed by the receiver, the adjustment control, or any other circuitry, module, electronics, or computational element within the system.

One benefit of the embodiments according to the present invention is that the measurement and calibration process requires no significant reconfiguration of or addition to the operational transmit/receive hardware, only the transmission of a reference signal instead of an operational signal and perhaps a slight, temporary reconfiguration of the signal flows through the system. Further, the calibration process is very brief and occupies only a very small portion of the operational duty cycle of the system. Calibration can thus be performed periodically during normal operations, such as once every few seconds. Calibration can also be performed on demand, such as when the performance of the system is detected to be shifting or degrading, or upon manual command of a system operator.

The embodiments in accord with the present invention do not require a transmit side or a receive side to be limited to only a single signal path, and a system may practice the present invention with pluralities of subject signal paths on both the transmit side and the receive side, for instance through a multi-step measurement and calibration process. In such a multiple-plurality system, for example one transmit-side subject signal path can be energized and multiple receive-side subject signal paths may be measured and calibrated from it, and separately one or more calibrated receive-side subject signal paths may be energized and used to measure and calibrate multiple transmit-side subject signal paths.

Although limited embodiments of the present invention have been specifically described and illustrated, many modifications, combinations, and variations will be apparent to those skilled in the art. Accordingly, it is to be understood that a radio frequency transmit/receive system constructed and a measurement and calibration method practiced according to the principles of this invention may be embodied other than as specifically described herein. The invention is also defined in the following claims.

What is claimed is:

1. A method for measuring aspects of signal propagation times among various transmitting or receiving signal paths in a radio frequency transmit/receive system for calibrating said signal paths to a common time reference, comprising:
generating a radio frequency reference signal;
transmitting the reference signal through a transmit side comprising at least one transmitting signal path comprising an antenna radiating element, wherein transmitting signal path and antenna radiating element are also usable for transmitting an operational signal;
transmitting the reference signal through a local oscillator feed line to a mixer;
propagating the transmitted reference signal through a first mutual coupling field from said antenna radiating element to a first antenna receiving element;
receiving, by the mixer, a first propagated reference signal through a first receive side comprising a first receiving signal path including the first antenna receiving element, wherein the first receiving signal path and the first antenna receiving element are also usable for receiving the operational signal, and wherein the operation signal is different from the reference signal;
mixing the first propagated reference signal with the reference signal by the mixer:
acquiring a first heterodyned signal from the mixer;
analyzing a first frequency profile of the first propagated reference signal to determine a difference in arrival time of the reference signal and the first propagated reference signal at the mixer;
propagating the transmitted reference signal through a second mutual coupling field from said antenna radiating element to a second antenna receiving element;
receiving, by the mixer, a second propagated reference signal through a second receive side comprising a second receiving signal path including the second antenna receiving element, wherein the second receiving signal path and the second antenna receiving element are also usable for receiving the operational signal;
mixing the second propagated reference signal with the reference signal by the mixer:
acquiring a second heterodyned signal from the mixer;
analyzing a second frequency profile of the second propagated reference signal to determine a difference in arrival time of the reference signal and the second propagated reference signal at the mixer;
and
processing the difference in arrival time of the reference signal and the first propagated reference signal and the difference in arrival time of the reference signal and the second propagated reference signal to determine a relative propagation time difference between the first receiving and the second receiving signal paths.

2. The method of claim 1 wherein:
said first and second antenna receiving elements are disposed substantially along an equipotential surface of a mutual coupling field of said at least one antenna radiating element.

3. The method of claim 1, wherein said processing comprises measuring relative path-to-path, signal propagation elapsed time.

4. The method of claim 1, wherein said processing comprises ascertaining at least one component related to at least one heterodyned product of at least one reference signal instance.

5. The method of claim 1, wherein the reference signal comprises pulse compression modulation.

6. The method of claim 1, further comprising adjusting propagation time of a signal through at least one of the first receiving and the second receiving signal paths based on a determination of at least one characteristic of propagation time of a signal in relation to at least one of the first receiving and the second receiving signal paths.

7. The method of claim 6, wherein adjusting said propagation time further comprises making one or more additional adjustments to the propagation time of a signal through at least one of the first receiving and the second receiving signal paths subsequent to a first adjustment and based on an additional one or more determinations of said at least one characteristic of propagation time of a signal in relation to at least one of the first receiving and the second receiving signal paths made subsequent to a first determination.

8. The method of claim 6, wherein the adjusting propagation time causes an instance of a signal propagating through one of the first receiving and the second receiving signal paths to complete its propagation through a signal path of the radio frequency transmit/receive system for said instance at substantially the same time as a signal instance propagating through another of the first receiving and the second receiving signal paths completes its propagation through the signal path of the system for such other instance.

9. The method of claim 1, wherein the at least one characteristic comprises an absolute propagation time of a signal through the first receiving and the second receiving signal paths.

10. A method for measuring aspects of signal propagation times among various transmitting or receiving signal paths in a radio frequency transmit/receive system for calibrating said signal paths to a common time reference, comprising:
generating a first and a second radio frequency reference signals;
transmitting the first reference signal through a first transmit side comprising a first transmitting signal path comprising a first antenna radiating element, wherein the first transmitting signal path and the first antenna radiating element are also usable for transmitting an operational signal, and wherein the operation signal is different from the reference signal;
transmitting the first reference signal through a local oscillator feed line to a mixer:
propagating the transmitted first reference signal through a first mutual coupling field from said first antenna radiating element to an antenna receiving element;
receiving, by the mixer, a first propagated reference signal through a receive side comprising a receiving signal path including the antenna receiving element, wherein the receiving signal path and the antenna receiving element are also usable for receiving the operational signal;
mixing the first propagated reference signal with the first reference signal by the mixer;
acquiring a first heterodyned signal from the mixer;
analyzing a first frequency profile of the first propagated reference signal to determine a difference in arrival time of the first reference signal and the first propagated reference signal at the mixer;
transmitting the second reference signal through a second transmit side comprising a second transmitting signal path comprising a second antenna radiating element, wherein the second transmitting signal path and the second antenna radiating element are also usable for transmitting the operational signal;
transmitting the second reference signal through the local oscillator feed line to the mixer;
propagating the transmitted second reference signal throuqh a second mutual coupling field from said second antenna radiating element to the antenna receiving element;
receiving, by the mixer, a second propagated reference signal through said receive side;
mixing the second propagated reference signal with the second reference signal by the mixer;
acquiring a second heterodyned signal from the mixer;
analyzing a second frequency profile of the second propagated reference signal to determine a difference in arrival time of the second reference signal and the second propagated reference signal at the mixer; and
processing the difference in arrival time of the first reference signal and the first propagated reference signal and the difference in arrival time of the second reference signal and the second propagated reference signal to determine a relative propagation time difference between the first transmitting and the second transmitting signal paths.

11. The method of claim 10, wherein said processing comprises measuring relative path-to-path, signal propagation elapsed time.

12. The method of claim 10, wherein said processing comprises ascertaining at least one component related to at least one heterodyned product of at least one reference signal instance.

13. The method of claim 10, wherein the reference signal comprises pulse compression modulation.

* * * * *